US010666764B2

(12) United States Patent
Judd et al.

(10) Patent No.: US 10,666,764 B2
(45) Date of Patent: May 26, 2020

(54) SYSTEMS AND METHODS TO DISTRIBUTE AN AIRCRAFT OPERATIONS COMMUNICATION (AOC) APPLICATION TO COMMUNICATION COMPONENTS IN A VEHICLE

(71) Applicant: Honeywell International Inc., Morris Plains, NJ (US)

(72) Inventors: Thomas D. Judd, Woodinville, WA (US); Kathryn Bates Hill, Milton-Freewater, OR (US); Thomas F. McGuffin, Bellevue, WA (US)

(73) Assignee: Honeywell International Inc., Morris Plains, NJ (US)

( * ) Notice: Subject to any disclaimer, the term of this patent is extended or adjusted under 35 U.S.C. 154(b) by 314 days.

(21) Appl. No.: 15/089,348

(22) Filed: Apr. 1, 2016

(65) Prior Publication Data
US 2017/0289309 A1   Oct. 5, 2017

(51) Int. Cl.
*H04L 29/08*   (2006.01)
*G06F 15/00*   (2006.01)
(Continued)

(52) U.S. Cl.
CPC .............. *H04L 67/34* (2013.01); *B64D 45/00* (2013.01); *G06F 3/06* (2013.01); *G06F 13/00* (2013.01);
(Continued)

(58) Field of Classification Search
CPC ....... H04L 51/046; H04L 67/12; H04L 63/10; H04L 67/34; H04L 67/36; H04L 67/18; H04L 67/10; H04L 29/0899; H04L 41/024; G08G 5/0013; G08G 5/0021; H04B 7/18506; G06Q 30/02; G06Q 50/32;
(Continued)

(56) References Cited

U.S. PATENT DOCUMENTS 6,816,728 B2   11/2004 Igloi et al.
7,260,389 B2   8/2007 Allen et al.
(Continued)

OTHER PUBLICATIONS

European Patent Office, "Extended European Search Report for EP Application No. 17157740.6", "From U.S. Appl. No. 15/089,348", dated Aug. 9, 2017, pp. 1-9, Published in: US.
(Continued)

*Primary Examiner* — Jungwon Chang
(74) *Attorney, Agent, or Firm* — Fogg & Powers LLC

(57) ABSTRACT

A system to distribute an Aircraft Operations Communication (AOC) application is provided. The system includes communication components in a vehicle, and an AOC database. The communication components include one of: a Communication Management Unit (CMU); or a Communication Management Function (CMF); and at least one of: at least one electronic flight bag (EFB); and at least one cabin terminal. The AOC database includes an operational configuration for aircraft operations communication for the communication components in the vehicle. The AOC database is loaded into at least one of: the CMU, the CMF, the at least one EFB; the at least one cabin terminal; and a database device. The AOC database configures the operation of the communication components in the vehicle.

17 Claims, 5 Drawing Sheets

(51) Int. Cl.
  *G06Q 50/32* (2012.01)
  *G08G 5/00* (2006.01)
  *G06F 13/00* (2006.01)
  *G06F 17/00* (2019.01)
  *G06F 3/06* (2006.01)
  *G06Q 50/30* (2012.01)
  *B64D 45/00* (2006.01)
  *H04L 12/24* (2006.01)

(52) U.S. Cl.
  CPC .............. *G06F 15/00* (2013.01); *G06F 17/00* (2013.01); *G06Q 50/30* (2013.01); *G06Q 50/32* (2013.01); *G08G 5/0021* (2013.01); *H04L 29/0899* (2013.01); *H04L 41/024* (2013.01); *H04L 67/36* (2013.01); *B64D 2045/0075* (2013.01); *G08G 5/0013* (2013.01); *H04L 67/10* (2013.01); *H04L 67/12* (2013.01); *H04L 67/18* (2013.01)

(58) Field of Classification Search
  CPC ......... G06Q 50/30; G06F 3/0481; G06F 3/14; G06F 8/61; G06F 8/65; G06F 15/00; G06F 13/00; G06F 17/00; G06F 3/06; G06G 5/0039; B64D 45/00; B64D 2045/0075
  USPC ........ 709/220; 370/331, 316; 455/431, 3.02, 455/73; 703/28; 342/36
  See application file for complete search history.

(56) References Cited

U.S. PATENT DOCUMENTS

| | | | | |
|---|---|---|---|---|
| 7,599,691 | B1* | 10/2009 | Mitchell | G06Q 30/02 455/3.02 |
| 2007/0126621 | A1* | 6/2007 | Sandell | G08G 5/0013 342/36 |
| 2007/0130437 | A1 | 6/2007 | Larson et al. | |
| 2009/0041041 | A1 | 2/2009 | True et al. | |
| 2009/0103473 | A1* | 4/2009 | Foster | H04B 7/18506 370/316 |
| 2009/0138871 | A1* | 5/2009 | Kimberly | G06F 8/61 717/173 |
| 2010/0075614 | A1* | 3/2010 | Judd | H04B 7/18506 455/73 |
| 2011/0028147 | A1* | 2/2011 | Calderhead, Jr. | H04B 7/18506 455/431 |
| 2011/0255506 | A1* | 10/2011 | Toth | H04B 7/18506 370/331 |
| 2012/0271616 | A1* | 10/2012 | Ludwig | G06F 3/14 703/28 |
| 2013/0232237 | A1* | 9/2013 | Zulch, III | H04B 7/18506 709/220 |
| 2013/0247025 | A1* | 9/2013 | Barberet | G06F 8/65 717/173 |
| 2014/0075506 | A1* | 3/2014 | Davis | H04L 67/12 726/3 |
| 2015/0089392 | A1* | 3/2015 | McGuffin | G06F 3/0481 715/753 |
| 2016/0093221 | A1* | 3/2016 | Bailey | G08G 5/0039 701/120 |
| 2016/0093222 | A1* | 3/2016 | Hale | G08G 5/0039 701/120 |
| 2016/0154642 | A1* | 6/2016 | Mason | G06F 8/61 717/172 |

OTHER PUBLICATIONS

Burgemeister, "ATN Security in the Real World", May 22, 2003, pp. 1-3, Published in: Montreal, Canada.

Evans et al., "Usability of EFBS for Viewing NOTAMS and AIR/MET Data Link Messages", Oct. 16, 2013, pp. 1-14, Publisher: IEEE, Published in: Hampton, VA.

Teledyne, "Teledyne Brings New Level of Connectiviry Between the Pilots, the Aircraft and the Ground", May 20, 2014, pp. 1-3, Published in: El Segundo, CA.

Teledyne, "Brochure—GroundLink Comm + System", Sep. 1, 2014, pp. 1-4, Published in: El Segundo, CA.

Teledyne, "Teledyne launches new technology to bring greater connectivity between the pilot, the aircraft and the ground", Nov. 2, 2015, pp. 1-3, Published in: El Segundo, CA.

European Patent Office, "Communication pursuant to Article 94(3) EPC from EP Application No. 17157740.6", from Foreign Counterpart to U.S. Appl. No. 15/089,348, dated Mar. 9, 2020, pp. 17, Published: EP.

* cited by examiner

SYSTEMS AND METHODS TO DISTRIBUTE AN AIRCRAFT OPERATIONS COMMUNICATION (AOC) APPLICATION TO COMMUNICATION COMPONENTS IN A VEHICLE

BACKGROUND

Many Aircraft include a Communication Management Unit (CMU)/Communication Management Function (CMF). In prior art systems, the CMU/CMF includes a configurable Aircraft Operations Communication (AOC) application. Those skilled in the art also use the acronym AOC to indicate Airline Operations Control. The configurable AOC allows the operator to customize many features of the AOC; such as format messages; determine whether to display the message on a display; customize the display of messages on a display; determine when to send a message (e.g., automatically send or send upon receiving input from a pilot or other user); determine what data, if any, available in the CMU should be incorporated into the message. Other configurable functions are available in the AOC as is known to one skilled in the art.

The operator defines the configurable AOC application within the CMU/CMF with an loadable file such as an Aircraft Operations Communication (AOC) database (DB). The AOC database includes information used to select the various configurable options within the AOC such as: formatting and display of various uplink messages; formatting and display of various downlink message; the display of the pages and logic used to create the downlink messages; formats for printing uplink messages; and/or the logic behind the messages and display/HMI functions. Other information is included in the AOC database as is known to one skilled in the art.

There is a trend in avionics toward using electronic flight bags (EFBs) for some of the cockpit operations. An EFB may be brought onto the aircraft by a pilot or other crew member or the EFB may already be installed in the aircraft. An EFB may be brought onto the aircraft by a pilot or other crew member or the EFB may already be installed in the aircraft. In the past, EFBs were portable or fixed personal computers (PC). Now EFBs are personal devices, such as iPads or other types of personal pads.

SUMMARY

The present application relates to a system to distribute an Aircraft Operations Communication (AOC) application. The system includes communication components in a vehicle, and an AOC database. The communication components include one of: a Communication Management Unit (CMU); or a Communication Management Function (CMF); and at least one of: at least one electronic flight bag (EFB); and at least one cabin terminal. The AOC database includes an operational configuration for aircraft operations communication for the communication components in the vehicle. The AOC database is loaded into at least one of: the CMU, the CMF, the at least one EFB; the at least one cabin terminal; and a database device. The AOC database configures the operation of the communication components in the vehicle.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
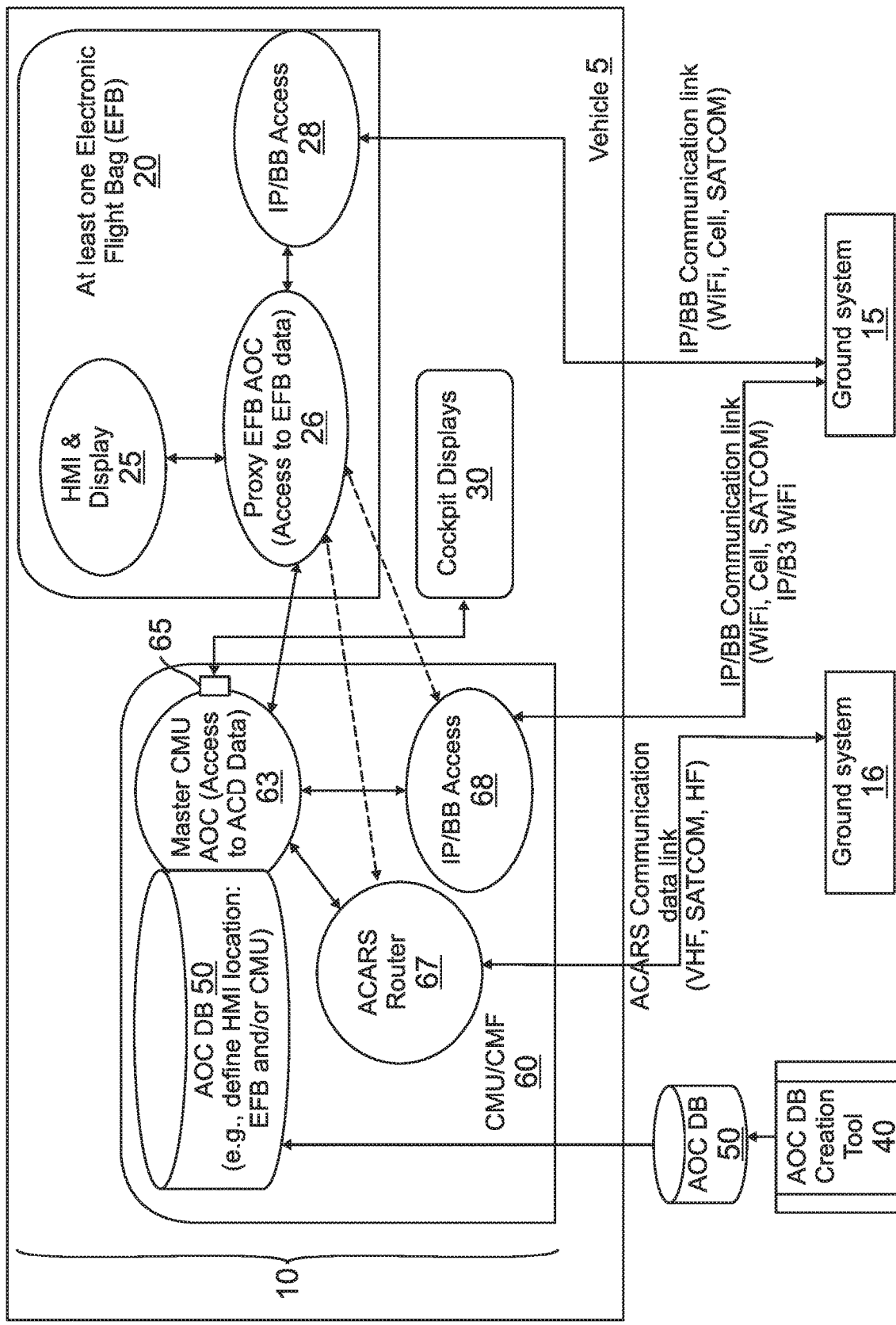
FIG. 1 shows an embodiment of an AOC database configured to distribute an Aircraft Operations Communication application to communication components in a vehicle in accordance with the present application.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

As noted above, the acronym AOC is used by those skilled in the art to indicate both "Aircraft Operations Communication" and "Airline Operations Control", which are used interchangeably herein. In the embodiments of the systems and methods described herein, the acronym AOC is applicable to both Aircraft Operations Communication and an Airline Operations Control.

Figure 5:
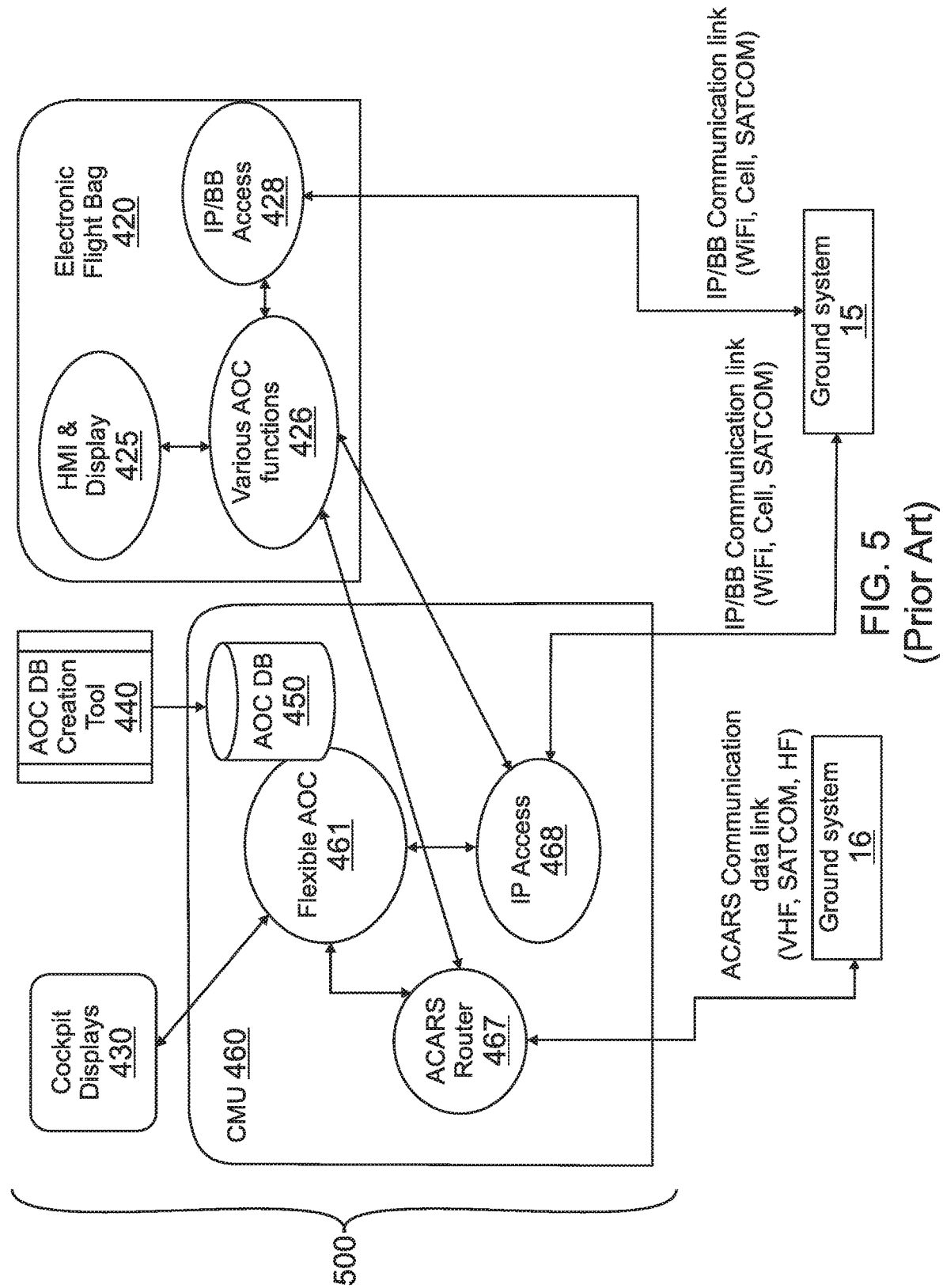
FIG. 5 shows a prior art system in which the Aircraft Operations Communication (AOC) application is not distributed.

Some EFB's are being developed with an AOC built into the EFB, however, the AOC functions on the EFB are independent from the AOC in the CMU; there is no communication between the two. An example of such an embodiment is shown in FIG. 5. FIG. 5 shows a prior art system 500 in which the Aircraft Operations Communication (AOC) application is not distributed. The prior art system 500 includes a CMU 460, cockpit display 430, and an EFB 420 that has been brought onto the vehicle (not shown). The CMU 460 includes the AOC database 450, AOC software 461, a router 467 with access to an external ground communication system 16, and an Internet protocol (IP) access 468 to an external ground communication system 15. The EFB 420 includes various AOC functions 426, human machine interfaces (HMI) and displays 425, and an IP/broadband (BB) access 428 to the communication system 15 external to the vehicle 5. The EFB AOC applications today tend to be about getting information like weather, Airport information, written notifications issued to pilots before a flight (i.e., NOTAMs), etc.

The prior art system 500 works as long as the AOC functions provided on the EFB 420 only augment the traditional AOC functions in the CMU 460. However, as the scope and complexity of AOC functions in the EFB 420 grow, a new problem of managing the AOC functions across the two CMU and EFB platforms occurs. Additionally, as EFBs are moved from one aircraft to another aircraft the CMU AOC application on the aircraft may be different. If the AOC function 426 in the EFB 460 is not communicatively coupled to the AOC database 450 in the CMU 460 of the aircraft there can be several problems, which cause conflict and confusion for the pilot, and which adds to the workload for the crews. For example, it is difficult to define what minimal AOC features would be needed on the cockpit displays 430. There is a fixed definition of the AOC in an EFB 420. In order to make any changes to the AOC in an EFB 420, it is currently necessary to change (rewrite) code and approve the EFB 420 after any changes are made. With an EFB AOC 426 that is independent of what is on the CMU AOC 461 there can be duplications or inconsistencies between the two. This can cause conflicts and confusion for the pilot, which adds to the workload for the crews. This can be especially challenging during periods of high work load and in the event of an aircraft emergency. With independent EFB AOC 426 and CMU AOC 461, the EFB AOC 426 will have access to EFB data, but not CMU data, while the CMU 460 will not have access to EFB data. Thus, there could be no coordination between EFB AOC 426 and CMU AOC 461. It may be unclear to the crews, where to find different AOC messages, so they will need to check both EFB AOC 426 and CMU AOC 461. Some EFB specific data wouldn't be available to the CMU AOC 461. Certain EFB AOC messages, which may be better suited for the cockpit displays 430, are stuck on EFB displays 425. All potential data available in the prior art CMU 460 needs to be provided securely to the EFB AOC application. Additionally, the EFB AOC messages, which may be same or similar to the CMU messages, could be formatted differently and sent via different routes.

As more and more AOC functions are hosted on the EFB, there is a need to coordinate the various AOC functions in the CMU/CMF and the EFB. There is also an opportunity for synergy between the CMU/CMF and the EFB AOC functions such as data sharing, data exchange, taking advantage of different display attributes, etc.

The embodiments of systems and methods described herein overcome these problems with the prior art system 500 by distributing an Aircraft Operations Communication (AOC) application between or among communication components in the vehicle. This is done using an AOC database, which includes an operational configuration for Aircraft Operations Communication for the communication components in the vehicle. The AOC database is positioned in at least one of: the CMU, the CMF, the at least one EFB, and a database device. The AOC database configures the operation of the communication components in the vehicle so that messages are: sent within the vehicle; downlinked from the vehicle; and uplinked to the vehicle based on the distribution of the AOC application from the AOC database. The communication components in the vehicle include at least one electronic flight bag (EFB) in the vehicle and at least one of: a Communication Management Unit (CMU) in the vehicle; or a Communication Management Function CMF in the vehicle.

The systems and methods described herein provide a setup configuration for an AOC database that is distributable between a CMU, which uses a flight deck human machine interface (HMI) with flight deck display, and an EFB, which has its own display and HMI. The distributed AOC database (also called Airline Modifiable Information or AMI) is configurable. The AOC Database/AMI is configured using ground based equipment; e.g., Ground Based Software Tool (GB ST) or Aircraft Communications Addressing and Reporting System (ACARS) Reconfiguration Tool (ART). The AOC databases described herein are configured to distribute an Aircraft Operations Communication (AOC) application to communication components in a vehicle and are also referred to herein as "distributed AOC databases".

The distributed AOC database provides flexibility and the following advantages:

1. The airline/Operator can define configurable AOC messages/applications and can put the appropriate messages/applications on the best suited HMI/display;

2. The data available from CMU/CMF and data available from EFB can be shared and/or allocated to the EFB or CMU; thus configuring whether the AOC function/data will be displayed on cockpit displays/HMI and/or EFB displays/HMI;

3. Uplinks and downlinks (message logs) can be allocated between EFB and Cockpit HMI/displays as appropriate and as needed; the distributed AOC database can manage the disposition of messages in the log (such as, text display, graphical display, print, print to storage (also known as electronic print, response message, etc.)) from either HMI;

4. Any available EFB data needed for a particular CMU/CMF AOC application/message can be identified in the distributed AOC database application and provided as needed (broadcast or request/response); other EFB data does not necessarily need to be shared;

5. Any available CMU/CMF data needed for a particular EFB AOC message and/or application as identified in the distributed AOC database application can be provided to EFB for AOC as needed (broadcast or request/response); other CMU/CMF data does not necessarily need to be provided;

6. Security mechanisms can be commonly configured and shared via distributed AOC Database;

7. The format, content, and routing preferences for messages can be configured to be common so the Airline Operations ground systems that receive messages from the airplane and send messages to the airplane will have consistent message processing no matter where on the airplane (CMU or EFB) the message is processed, displayed, etc.

The terms CMU and CMF are referred to interchangeably herein. The AOCs described herein are the AOCs that are traditionally in the CMU or CMF function. In one implementation of this embodiment, the CMF is hosted on an Air Traffic Services Unit (ATSU) platform.

FIG. 1 shows an embodiment of an AOC database 50 configured to distribute an Aircraft Operations Communication application to communication components in a vehicle 5 in accordance with the present application. The vehicle 5 includes a system 10. As shown in FIG. 1, the system 10 includes a CMU 60, at least one cockpit display/HMI 30, and an EFB 20 on the vehicle 5.

The system 10 includes a master AOC 63 in which the AOC database 50 is loaded in one of a CMU 60 or a CMF 60. At least one EFB 20 includes a respective at least one proxy AOC 26. The master AOC 63 is communicatively coupled to the at least one proxy AOC 26 to distribute the AOC application based on the operational configuration of the Aircraft Operations Communication for the proxy AOC 26. The AOC application is distributed to the master AOC 63 based on the operational configuration of the Aircraft Operations Communication DB 50 for the master AOC 63. The proxy AOC 26 provides access to the EFB data on the at least one EFB 20 to the CMU 60. In one implementation of this embodiment, the proxy AOC 26 sends datalink messages to the cockpit HMI via the master CMU AOC 63. As used herein, an AOC that is loaded into either a CMU or a CMF is referred to as a "CMU AOC".

The CMU 60 includes the AOC database 50, a master communication management unit (CMU) AOC 63, a router 67 to provide access to a communication system 16 external to the vehicle 5, and an access 68 to a communication system 15 external to the vehicle 5. The master CMU AOC 63 includes an interface 65 used to communicatively couple the master CMU AOC 63 to the cockpit display/HMI 30. If the CMU/CMF 60 is a CMF 60, the master CMU AOC 63 is also referred to as a master CMF AOC 63. Likewise, if the CMU/CMF 60 is a CMU 60, the master CMU AOC 63 is also referred to as a master CMU AOC 63.

In one implementation of this embodiment, the router 67 is an ACARS router that is communicatively coupled via ACARS air-to-ground data links (e.g., very high frequency (VHF), SATCOM, and high frequency (HF)) to the ground system 16. In another implementation of this embodiment, the access 68 is an Internet Protocol (IP) or broadband (BB) access 68 that is communicatively coupled via Internet Protocol (IP), or broadband (BB) communication links (e.g., WiFi, Cellular, or SATCOM) to the vehicle 5.

An AOC database creation tool 40 is shown in FIG. 1. The AOC database creation tool 40 is ground support equipment used to create the AOC database 50 that is used to distribute the AOC application to the communication components 20 and 60 in the vehicle 5. The downloading of the AOC database from the AOC database creation tool 40 to the master CMU AOC 63 can happen off-line before the master CMU AOC 63 is loaded onto the vehicle 5 or as needed to upgrade the master CMU AOC 63 on the vehicle 5. The AOC database Tool 40 and the distributed AOC database 50 (i.e., a GB ST generated AMI or ART generated AOC database) is used by an airline/operator to configure the messaging, including definition/format display (e.g., downlink message request/report pages with optional data/inputs and uplink message), message trigger (e.g., automatic or manually initiated), data (avionics data available to CMU/CMF) to include in message and associated displays, message log. In one implementation of this embodiment, the airlines configure the AOC database creation tool 40 to define the format of messages, format the displays, and provide the logic for sending messages according to the regulations, Airline/Operator preferences, etc. In one implementation of this embodiment, the AOC database (e.g., AOC database 50) described herein is a configuration file. In another implementation of this embodiment, the AOC database (e.g., AOC database 50) described herein is configured as software. In yet another implementation of this embodiment, the AOC database (e.g., AOC database 50) described herein is configured as an application on a personal device.

The EFB 20 includes a proxy (or slave) EFB AOC 26 (also referred to herein as proxy AOC 26), human machine interface (HMI) and display 25, and access 28 to the communication system 15 external to the vehicle 5. In this embodiment, the AOC database 50 is included in the CMU 60 and is configured to distribute the data in the AOC database 50 to the cockpit displays 30, CMU 60, and to the EFB 20. In this embodiment, the master CMU AOC 63 distributes the AOC database 50 to at least one proxy EFB AOC 26. The distributed AOC database 50 is also configured to identify sources of input data from the CMU 60 as well as from the EFB 20. The HMI can include a display and/or a printer.

The master CMU AOC 63 includes the distributed AOC database 50 or has access to the distributed AOC database 50 on the CMU 60. The master CMU AOC 63 provides access to the Aircraft Control Domain (ACD) data in the CMU 60, which is a secure domain of the vehicle 5.

In one implementation of this embodiment, the router 67 is an ACARS 618 router. The master CMU AOC 63 is communicatively coupled to the router 67 and to the IP/BB access 68. In one implementation of this embodiment, the access 68 is referred to as "internet protocol (IP) access 68". The master CMU AOC 63 is also communicatively coupled to the at least one cockpit display/HMI 30. The master CMU AOC 63 sends instructions, data, and messages to the cockpit display 30 to display uplink and downlink messages, message logs, and data relevant to the Airline operations of the vehicle 5.

The master CMU AOC 63 is also communicatively coupled with the proxy EFB AOC 26 in the EFB. The proxy EFB AOC 26 and the CMU 60 may have access to the data on the EFB 20. The proxy EFB AOC 26 is communicatively coupled to the HMI and display 25. The proxy EFB AOC 26 is communicatively coupled, via the IP/BB access 28 in the EFB 20, to the communication system 15. The proxy EFB AOC 26 is communicatively coupled to the CMU 60 to provide access to the EFB data on the EFB 20 to the CMU 60.

The distributed AOC database 50 uses a common interface between the CMU 60 (i.e., CMU/CMF 60) and the EFB 20 to configure the items that will be used in EFB 20 and CMU 60.

In one implementation of this embodiment, the master CMU AOC 63 is an extension of an existing product specific CMF AOC application. In another implementation of this embodiment, the master CMU AOC 63 is a new core ported to each product with platform specific parts. In yet another implementation of this embodiment, the proxy EFB AOC 26 is an extension of an existing EFB product used for additional functions (e.g. storage of pilot manuals) and thus it is unique per the current configuration of the EFB 20. In yet another implementation of this embodiment, the proxy (i.e., EFB) AOC 26 includes all the basic EFB functions and so it is not platform specific.

In yet another implementation of this embodiment, there is more than one EFB 20 communicatively coupled to the distributed AOC database 50 via the CMU 60 as described below with reference to FIG. 3. In yet another implementation of this embodiment, the system 10 includes an EFB 20 in the cockpit and a cabin terminal for the cabin crew (e.g., fight attendants). In yet another implementation of this embodiment, the EFB AOC 26 in the EFB 20 is the master AOC and CMU AOC 63 in the CMU 60 is the proxy (slave) AOC.

Figure 2:
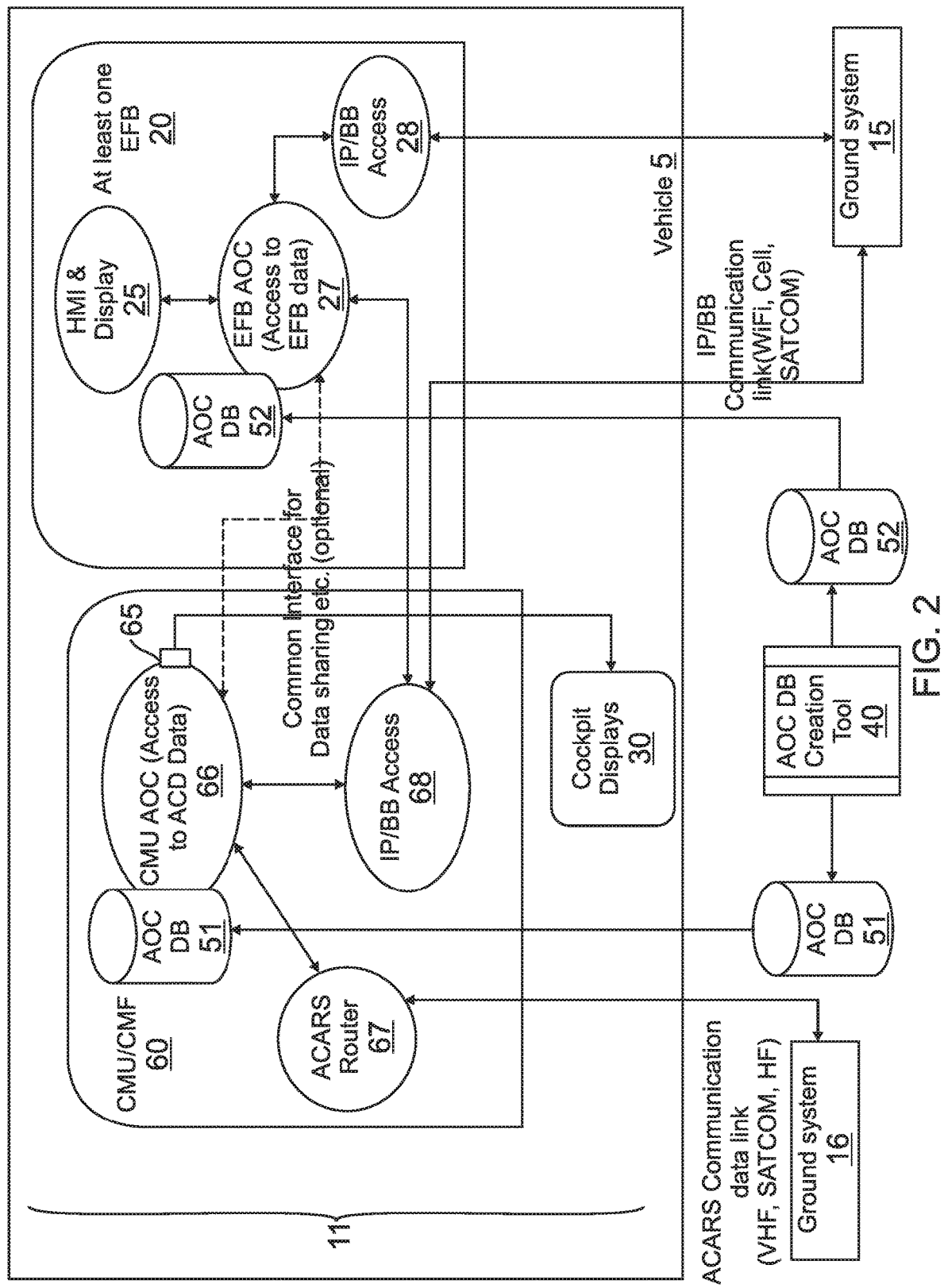
FIG. 2 shows an embodiment of a first AOC database and a second AOC database configured to distribute an Aircraft Operations Communication application to communication components in a vehicle in accordance with the present application.

FIG. 2 shows an embodiment of a first AOC database 51 and a second AOC database 52 configured to distribute an Aircraft Operations Communication application to communication components in a vehicle 5 in accordance with the present application. The vehicle 5 includes a system 11. System 11 includes a communication management unit CMU AOC 66 in which a first AOC database 51 is loaded, and at least one EFB AOC 27 in which a respective at least one second AOC database 52 is loaded. The CMU AOC 66 is communicatively coupled to the at least one EFB AOC 27 and to a human machine interface HMI/display 30 in the cockpit. The CMU AOC 66 distributes the AOC application based on the operational configuration of the one of the CMU 60. The at least one EFB AOC 27 distributes the AOC application based on the operational configuration of the respective at least one EFB 27. System 11 includes the CMU 60, at least one cockpit display 30, and an EFB 20 on the vehicle 5.

The CMU 60 includes the first AOC database 51, a communication management unit (CMU) AOC 66, a router 67 to provide access to a communication system 16 external to the vehicle 5, and an access 68 to a communication system 15 external to the vehicle 5. The router 67 has the structure and function of the router 67 described above with reference to FIG. 1. The IP/BB access 68 has the structure and function of the router 68 described above with reference to FIG. 1. The CMU AOC 66 includes an interface 65 used to communicatively couple the CMU AOC 66 to the cockpit display 30. If the CMU/CMF 60 is a CMF 60, the CMU AOC 66 is also referred to as a CMF AOC 66. Likewise, if the CMU/CMF 60 is a CMU 60, the CMU AOC 66 is also referred to as a CMU AOC 66.

The EFB 20 includes the second AOC database 52, an EFB AOC 26, human machine interfaces (HMI) and displays 25, and access 28 to the communication system 15 external to the vehicle 5.

In this embodiment, the first AOC database 51 is included in the CMU 60 and is used by the CMU AOC 66 to manage displays sent to the cockpit display 30 and to manage the messages and data sent to and from the router 67, the IP access 68, as well as to the EFB 20. The first AOC database 51 also contains configuration data used by the CMU AOC 66 to manage communication with the EFB 20. The second AOC database 52 is included in the EFB 20. It contains configuration data used by the EFB AOC 27 to manage communication with the CMU 60. The second AOC database 52 is used by the EFB AOC 27 to manage displays sent to the HMI and display 25 and to manage the messages and data sent to and from the IP/BB access 28, and the CMU 60 as required.

The CMU AOC 66 provides access to Aircraft Control Domain (ACD) data in the CMU 60, which is a secure domain of the vehicle 5. The CMU AOC 66 is communicatively coupled to the router 67 and to the IP/BB access 68.

The CMU AOC 66 sends instructions, data, and messages to the cockpit display 30 to display uplink and downlink messages, and message logs. The CMU AOC 66 is also communicatively coupled to send data, requests, and commands, as needed, to the EFB AOC 27. The EFB AOC 27 has access to the data on the EFB 20, which, in some embodiments, is shared with the CMU AOC 66. In this manner, the EFB AOC 27 provides access to the EFB data on the EFB 20 to the CMU 60. In one implementation of this embodiment, the interface (IF) to the EFB 20 is a secure interface.

The EFB AOC 27 is communicatively coupled to the HMI and display 25 built into the EFB 20. In one implementation of this embodiment, the EFB AOC 27 is communicatively coupled to the IP/BB access 28 to the communication system 15. In another implementation of this embodiment, the EFB AOC 27 is communicatively coupled, via the ACARS router 67 in the CMU 60, to the communication system 16. In yet another implementation of this embodiment, the EFB AOC 27 is communicatively coupled, via the IP/BB access 28 in the EFB 20, to the communication system 15 and is also communicatively coupled, via the ACARS router 67 in the CMU 60, to the communication system 16.

In one implementation of this embodiment, the distributed AOC databases 51 and 52 use a common, well-defined interface between the CMU 60 (i.e., CMU/CMF) and the EFB 20 to configure the items that will be used in EFB 20 and CMU 60. In another implementation of this embodiment, the CMU AOC 66 is an extension of an existing product specific CMF AOC application. In yet another implementation of this embodiment, the CMU AOC 66 is a new core ported to each product with platform specific parts. In yet another implementation of this embodiment, the EFB AOC 27 is unique per the configuration of the EFB 20. In yet another implementation of this embodiment, the EFB AOC 27 includes a core part and minimizes any platform specific part.

The AOC database Tool 40, the first AOC database 51 (i.e., a GB ST/AMI or ART/ART database), and the second AOC database 52 are used by airline to configure the messaging including definition/format display (e.g., downlink message request/report pages with optional data/inputs and uplink message), message trigger (e.g., automatic or display), data (avionics data available to CMU/CMF) to include in message and associated displays, message log.

In one implementation of this embodiment, the first AOC database 51 in CMU 60 has the same format/data as AOC DB 52 in the EFB 20. In another implementation of this embodiment, the first AOC database 51 is in a different format/data from the format/data AOC DB 52. In some embodiments, the AOC database is separated from both the CMU 60 and the EFB 20. This is shown in FIG. 3.

Figure 3:
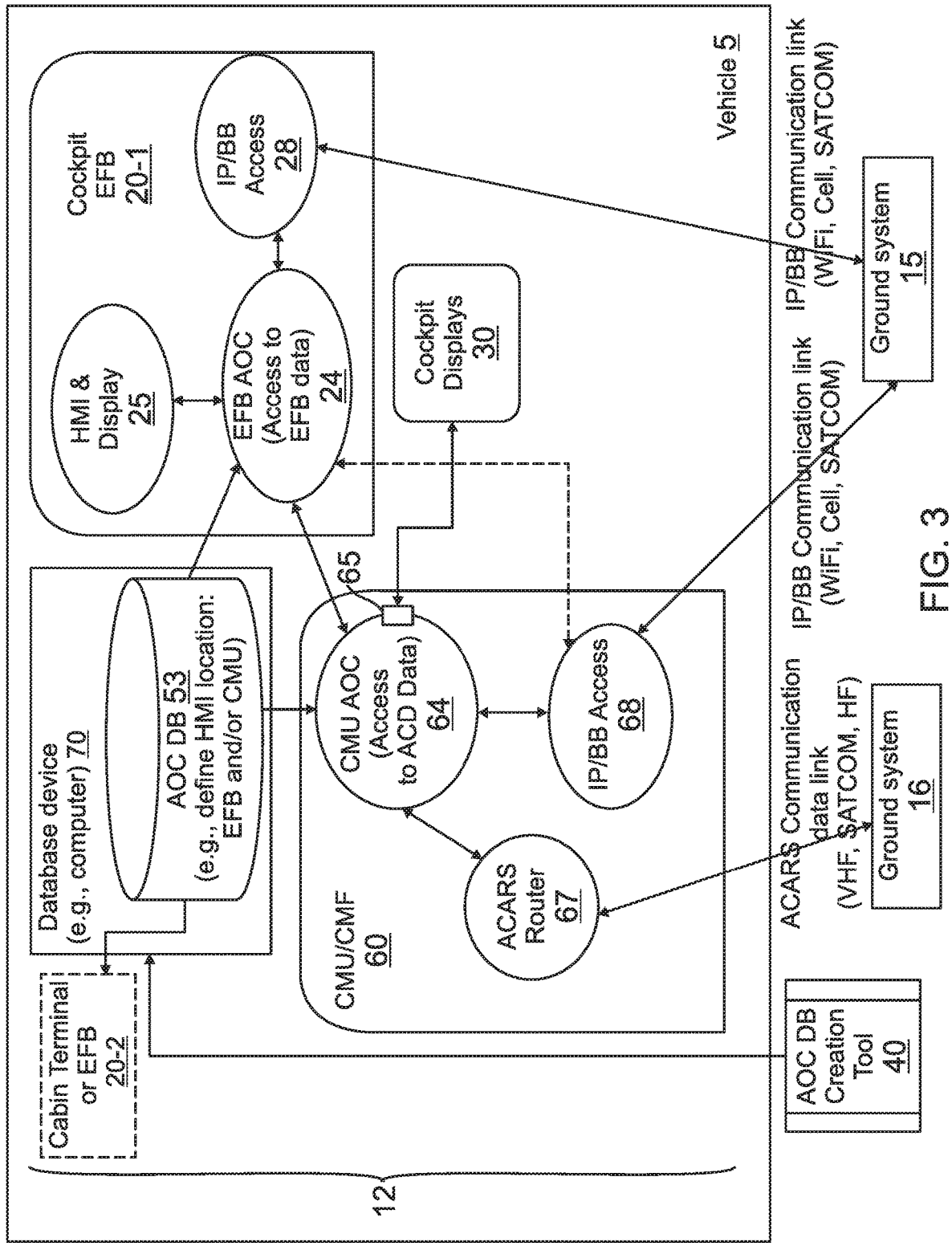
FIG. 3 shows an embodiment of an AOC database in a database device configured to distribute an Aircraft Operations Communication application to communication components in a vehicle in accordance with the present application.

FIG. 3 shows an embodiment of an AOC database 53 in a database device 70 configured to distribute an Aircraft Operations Communication application to communication components in a vehicle 5 in accordance with the present application. The vehicle 5 includes a system 12. In one implementation of this embodiment, system 12 includes a plurality of AOC databases 53 in a respective plurality of database devices 70 configured to distribute an Aircraft Operations Communication application to communication components in a vehicle 5. The system 12 includes the at least one database device 70, the CMU 60, at least one cockpit display/HMI 30 a cockpit EFB 20-1, and a cabin terminal (and/or second EFB) 20-2. The EFB 20-2 is optional. One or more Cabin Terminal/EFB like devices are optional.

An EFB 20-1 is brought onto the vehicle 5 by the pilot or copilot is referred to as a cockpit EFB 20-1. An EFB 20-2 brought onto the vehicle 5 by the flight attendant is referred to as a cabin EFB or a cabin terminal 20-2. In one implementation of this embodiment, a cabin terminal 20-2 is permanently or temporarily positioned in the cabin. In another implementation of this embodiment, a pilot EFB 20-1 is permanently or temporarily positioned in the cockpit.

The AOC database 53 is included in the database device 70 that is external to both the CMU 60 and the EFB 20. The database device 70 is configured to distribute the AOC database 53 to the communication components (i.e., the CMU 60, the cockpit EFB 20-1, and the second EFB 20-2).

The CMU 60 includes a CMU AOC 64, a router 67 to provide access to a communication system 16 external to the vehicle 5, and an access 68 to a communication system 15 external to the vehicle 5. The CMU AOC 64 includes an interface 65 that is used to interface the CMU AOC 64 to the cockpit display 30. The EFB 20-1 and optional EFB 20-2 each includes an EFB AOC 26, human machine interfaces (HMI) and displays 25, and access 28 to the communication system 15 external to the vehicle 5, which are only shown in the EFB 20-1. The database device 70 is communicatively coupled to the CMU AOC 64 and at least one EFB AOC 24 in at least one of the EFB 20-1 and/or EFB 20-2 on the vehicle 5.

The CMU AOC 64 is communicatively coupled to the at least one cockpit display/HMI 30, the router 67, and to the IP/BB access 68. The CMU AOC 64 is configured to use the configuration information from the AOC database 53 to determine what to display and send to the cockpit display 30 and how???, the router 67, and the IP/BB access 68 as required. The CMU AOC 64 is also communicatively coupled to input the data from the EFB AOC as needed. The CMU AOC 64 provides access to AirCraft Domain (ACD) data, which is also referred to as Aircraft Control Domain (ACD) data, in the CMU 60, which is a secure domain of the vehicle 5.

The router 67 has the structure and function of the router 67 described above with reference to FIG. 1. The IP/BB access 68 has the structure and function of the IP/BB access 68 described above with reference to FIG. 1. The CMU AOC 64 is also communicatively coupled to send data, requests, and commands, as needed, to the EFB AOC 24. The CMU AOC 64 sends instructions, data, and messages to the cockpit display 30 to display uplink and downlink messages, message logs, and data relevant to the Airline Operation of the vehicle 5.

The CMU AOC 64 is also communicatively coupled to send data, requests, and commands, as needed, to the EFB AOC 24 in at least one of the EFBs 20-1 and 20-2. The EFB AOC 24 has access to the AOC database 53 in the database device 70. The EFB AOC 24 is communicatively coupled to the HMI and display 25. The EFB AOC 24 is communicatively coupled, via the IP/BB access 28, to the communication system 15. The EFB AOC 24 provides access to the EFB data on the EFBs 20-1 and 20-2 to the CMU AOC 60.

The AOC database 53 utilizes the well known, common interface between the CMU (i.e., CMU/CMF) and the EFBs 20-1 and 20-2 to indicate the data items that will be used in EFB AOCs 20-1 and 20-2 and CMU AOC 60.

In one implementation of this embodiment, the CMU 60 includes a master CMU AOC 64 and the at least one EFB includes a respective at least one proxy EFB AOC 24. In this case, the master CMU AOC 64 is communicatively coupled to the at least one proxy EFB AOC 24 to distribute the AOC application based on the operational configuration of the Aircraft Operations Communication for the respective at least one proxy EFB AOC 24. The proxy EFB AOC 24 provides access to the EFB data on the at least one proxy EFB to the CMU 60. The AOC application is distributed to the master CMU AOC 64 based on the operational configuration of the Aircraft Operations Communication for the master CMU AOC 64.

In another implementation of this embodiment, the CMU 60 includes a CMU AOC 64 and the at least one EFB includes a respective at least one EFB AOC 24, which is not a slave to the CMU AOC 64. In this case, the AOC database 53 distributes the AOC application to the at least one EFB 21-1 based on the operational configuration of the respective at least one EFB 20-1 and the AOC application is distributed to the CMU AOC 64 based on the operational configuration of the Aircraft Operations Communication for the CMU AOC 64.

In one implementation of this embodiment, the at least one, respective database device 70 is a computer 70. In another implementation of this embodiment, the at least one, respective database device 70 is two or more personal devices. In this latter embodiment, the two or more personal devices could include one or more of: at least one personal EFB for at least one respective crew member (pilot, copilot, and/or flight attendant). For example, as shown in FIG. 3, the at least one personal devices include a pilot's EFB 20-1 and an optional flight attendant's or co-pilot's EFB 20-2. In an implementation of this embodiment, the at least one database device 70 is a computer housed in the cockpit of the vehicle 5. In another implementation of this embodiment, the database device 70 is positioned in an electronic bay in the cockpit of the vehicle 5. The exemplary database device 70 with the AOC database 53 shown in FIG. 3 is representative of a database device 70 with a plurality of AOC databases 53.

Some messages may be unique to a particular type of device. Other types of messages may be provided to one or more of the devices (e.g., to the cockpit display 30 and the pilot's EFB 20-1; to the one the cockpit display 30 and the flight attendant's EFB 20-2; or to the pilot's EFB 20-1 and the flight attendant's EFB 20-2). The AOC database 53 determines which of the messages go to the cockpit display 30 via CMU 60, which messages go to the HMI & display 25 in the pilot's EFB 20-1, and which messages go to the HMI & display 25 in the cabin terminal 20-2 or EFB 20-2.

In one implementation of this embodiment, the CMU AOC 64 is an extension of an existing product specific CMF AOC application. In another implementation of this embodiment, the CMU AOC 64 is a new core ported to each product with platform specific parts. In yet another implementation of this embodiment, the EFB AOC 24 is unique per the configuration of the EFB 20. In yet another implementation of this embodiment, the EFB AOC 24 includes a core part and minimizes any platform specific part.

In one implementation the system 12 includes a cockpit EFB 20-1 in a cockpit of the vehicle 5 and at least one cabin EFB 20-2 in a cabin of the vehicle 5. In another implementation of this embodiment, the system 12 includes at least one cockpit EFB in a cockpit of the vehicle 5 and at least one cabin terminal in a cabin of the vehicle 5. In yet another implementation of this embodiment, the system 12 includes a cockpit EFB 20-1 in a cockpit of the vehicle 5 and a cabin EFB 20-2 in a cabin of the vehicle 2. In yet another implementation of this embodiment, the system 12 includes a pilot's EFB 20-1 in a cockpit of the vehicle 5 and a co-pilot's EFB 20-2 in the cockpit of the vehicle 5. In yet another implementation of this embodiment, the system 12 includes a pilot's EFB 20-1 in a cockpit of the vehicle 5 and a co-pilot's EFB (i.e., a second cockpit EFB) in the cockpit of the vehicle 5 and a cabin EFB 20-5 in a cabin of the vehicle 5.

The AOC database tool 40 and the AOC database (i.e., a GB ST/AMI or ART/ART or AOC database) are used by an airline/operator to configure the messaging including definition/format display (e.g., downlink message request/report pages with optional data/inputs and uplink message), message trigger (e.g., automatic or manual), data (avionics data available to CMU/CMF) to include in the message and associated displays, and message log.

As understandable to one skilled in the art upon reading and understanding the present application, the AOC database creation tools 40 described herein are modified, so the AOC database creation tool 40 recognizes if the AOC databases are being created for: 1) a single master CMU AOC database; 2) a single master CMU AOC database and a proxy/slave AOC database in an EFB; 3) an AOC database and an EFB database; or 4) a plurality of AOC databases for individual EFBs and personal devices, or it must define the rules for each of the personal devices.

Figure 4:
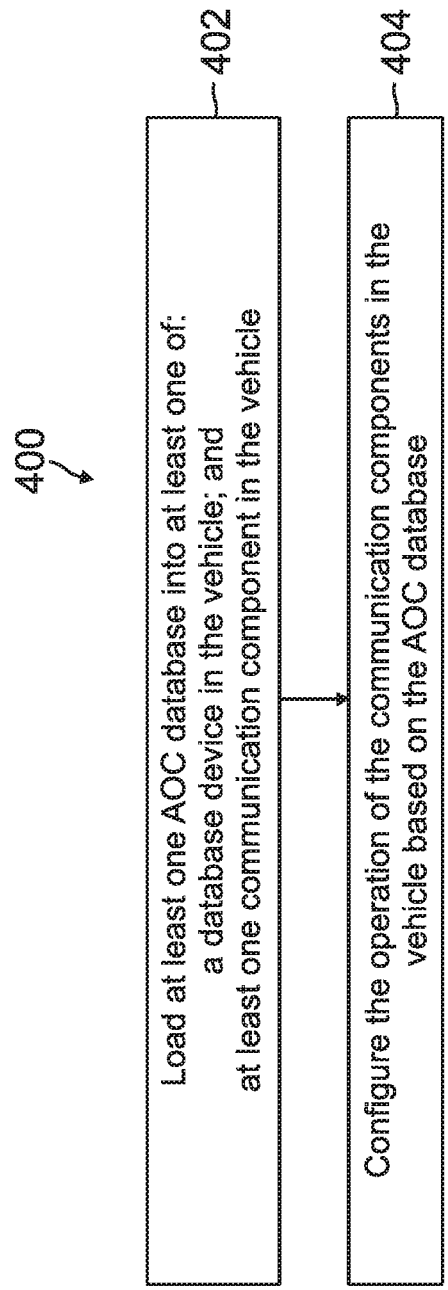
FIG. 4 shows a flow diagram of an embodiment of a method to distribute an Aircraft Operations Communication (AOC) application to communication components in a vehicle in accordance with the present application.

FIG. 4 shows a flow diagram of an embodiment of a method 400 to distribute an Aircraft Operations Communication (AOC) application in a vehicle in accordance with the present application. This method is applicable to the embodiments show and described with reference to FIGS. 1-3.

At block 402, at least one AOC database is loaded into at least one of: a database device in the vehicle; and at least one communication component in the vehicle. The communication components include one of: a Communication Management Unit (CMU); or a Communication Management Function (CMF); and at least one electronic flight bag (EFB).

For the system 10 shown in FIG. 1, at block 402, the AOC database 50 is loaded into a master communication management unit (CMU) AOC 63 in the CMU 60 (or the CMF 60). In this case, the AOC database definition is distributed to the master CMU AOC 63. The master CMU AOC 63 is communicatively coupled to the proxy EFB AOC 26 and applicable portions of the AOC DB definition is then distributed from the master CMU AOC 63 to the proxy EFB AOC 26.

For the system 11 shown in FIG. 2, at block 402, the first AOC database 51 is loaded into a CMU AOC 66 into the CMU 60 (or the CMF 60) and the AOC DB definition is distributed to the CMU AOC 66. Another AOC database (i.e., the second AOC database 52) is loaded into the EFB AOC 27 in the EFB 20 and the AOC DB definition is distributed to the EFB AOC 27. In this embodiment, the CMU AOC 66 is communicatively coupled to the EFB AOC 27 for data sharing.

For the system 12 shown in FIG. 3, in one implementation of block 402, the AOC database 53 is loaded into the database device 70. The AOC DB definition is distributed to the CMU AOC 64. The AOC application is also distributed to the EFB AOC 24. The CMU AOC 64 in the CMU 60 is communicatively coupled to the EFB AOC 24 for data sharing.

If the system 12 includes a second EFB 20-2, the AOC DB definition is also distributed to the EFB AOC 24. All the distributions are provided from the AOC database 53 in the database device 70. The CMU AOC 64 in the CMU 60 is communicatively coupled to the EFB AOC 24 in the EFB 20-2 for data sharing.

For the system 12 shown in FIG. 2, in another implementation of block 402, the CMU AOC 64 is a master CMU AOC 64 and the EFB AOC 24 is a proxy EFB AOC 24. In this case, the AOC application is distributed to the proxy EFB AOC 20-1 via the master CMU AOC 64 rather than being distributed from the database device 70.

At block 404, the operation of the communication components in the vehicle is configured based on the AOC database. Some of the exemplary operations (but not all of the possible operations) that the AOC database configures the communication components to implement include: defining message formats for the communication components in the vehicle; displaying of uplinks in the communication components in the vehicle; displaying of uplinks in a cockpit display in the vehicle; displaying of interfaces for human-machine interfaces for downlinks from the vehicle; displaying of data content; downlinking of messages from the communication components in the vehicle; and uplinking of messages to the communication components in the vehicle.

For all the embodiments described herein, there may be different types of data available to CMU and the EFB.

Additionally, the systems 10-12 described above with reference to FIGS. 1-3, respectively, can be used to route the messages based on a routing that is defined by the data in the AOC database 50, 51/52, and 53, respectively. Some exemplary routing includes: 1) traditional ACARS, such as ACARS VHF, ACARS SATCOM, ACARS HF; 2) a broadband SATCOM link; 3) WiFi; or 4) cellular data link. The data in the AOC database includes preference logic for the preferred link.

It is to be understood that although this has been described for an aircraft (including but not limited to airplanes, helicopters, space craft, etc.), the technology can be applied to other vehicles, including water-based vehicles (ships, boats, ferries, etc.) and land-based vehicles (automobiles, trucks, buses, etc.), that need to navigate and communicate with land-based stations or offices, such as the coast guard or an office for a business.

The various embodiments of the CMU/CMF EFB, displays, and database device include appropriate interfaces as known to one skilled in the art. The various embodiments of the CMU/CMF EFB, displays, and database device include or function with software programs, firmware or other computer readable instructions for carrying out various methods, process tasks, and control functions, used in the systems and methods to distribute an Aircraft Operations Communication application to communication components in a vehicle.

These instructions are typically stored on any appropriate computer readable medium used for storage of computer readable instructions or data structures. The computer readable medium can be implemented as any available media that can be accessed by a general purpose or special purpose computer or processor, or any programmable logic device. In one implementation, the processor comprises processor support chips, system support chips such as application-specific integrated circuits (ASICs) and field programmable gate arrays (FPGAs). Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

EXAMPLE EMBODIMENTS

Example 1 includes a system to distribute an Aircraft Operations Communication (AOC) application, the system comprising: communication components in a vehicle, the communication components including: one of: a Communication Management Unit (CMU); or a Communication Management Function (CMF); and at least one of: at least one electronic flight bag (EFB); and at least one cabin terminal; and an AOC database, which includes an operational configuration for aircraft operations communication for the communication components in the vehicle, the AOC database loaded into at least one of: the CMU, the CMF, the at least one EFB; the at least one cabin terminal; and a database device, wherein the AOC database configures the operation of the communication components in the vehicle.

Example 2 includes the system of Example 1, wherein the AOC database configures the operation of the communication components in the vehicle for at least one of: defining message formats for the communication components in the vehicle; displaying of uplinks in the communication components in the vehicle; displaying of uplinks in a cockpit display in the vehicle; displaying on an EFB display; interacting with the EFB HMI; displaying on a cabin terminal display; interacting with the cabin terminal HMI; displaying of downlinks in the communication components in the vehicle; displaying of data content; downlinking of messages from the communication components in the vehicle; and uplinking of messages to the communication components in the vehicle.

Example 3 includes the system of any of Examples 1-2, wherein the one of the CMU or the CMF includes a master AOC in which the AOC database is loaded, and wherein the at least one of: the at least one electronic flight bag (EFB); and the at least one cabin terminal includes a respective at least one proxy AOC, wherein the master AOC is communicatively coupled to the at least one proxy AOC to distribute the AOC application based on the operational configuration of the Aircraft Operations Communication for the proxy AOC, wherein the AOC application is distributed to the master AOC based on the operational configuration of the Aircraft Operations Communication for the master AOC, wherein the at least one proxy AOC provides access to the EFB data on the respective at least one of: the at least one electronic flight bag (EFB); and the at least one cabin terminal to the one of the CMU or the CMF; and wherein the at least one proxy AOC sends datalink messages to a human machine interface (HMI) of the respective at least one of: the at least one electronic flight bag (EFB); and the at least one cabin terminal.

Example 4 includes the system of Example 3, wherein the at least one proxy AOC in the at least one of: the at least one electronic flight bag (EFB); and the at least one cabin terminal is communicatively coupled to: a human machine interface (HMI) of the respective at least one of: the at least one electronic flight bag (EFB); and the at least one cabin terminal, the HMI including a display; and an access in the at least one of: the at least one electronic flight bag (EFB); and the at least one cabin terminal to an external communication system.

Example 5 includes the system of any of Examples 1-4, wherein the one of the CMU or the CMF includes a communication management unit (CMU) AOC, a router, an access to at least one external communication system; and an interface to a human machine interface/display in the cockpit.

Example 6 includes the system of any of Examples 1-5, wherein the one of the CMU or the CMF includes a master AOC in which the AOC database is loaded, a router, and an access to at least one external communication system; and wherein the at least one of: the at least one electronic flight bag (EFB); and the at least one cabin terminal in the vehicle includes a respective at least one: proxy AOC, a human machine interface, a display, and an access to one of the at least one external communication systems.

Example 7 includes the system of any of Examples 1-6, wherein the one of the CMU or the CMF includes a communication management unit (CMU) AOC in which a first AOC database is loaded, and wherein the at least one of: the at least one electronic flight bag (EFB); and the at least one cabin terminal includes a respective at least one EFB AOC in which a respective at least one second AOC database is loaded, wherein the CMU AOC is communicatively coupled to the at least one EFB AOC and to a human machine interface/display in the cockpit, wherein the CMU AOC distributes the AOC application based on the operational configuration of the one of the CMU or the CMF, wherein the at least one EFB AOC distributes the AOC application based on the operational configuration of the respective at least one of: the at least one electronic flight bag (EFB); and the at least one cabin terminal.

Example 8 includes the system of any of Examples 1-7, wherein the AOC database is loaded in the database device, wherein the database device is communicatively coupled to the one of the CMU or the CMF, wherein the AOC database distributes the AOC application to the one of the CMU or the CMF based on the operational configuration of the respective one of the CMU or the CMF.

Example 9 includes the system of Example 8, wherein the one of the CMU or the CMF includes a master communication management unit (CMU) AOC, wherein the at least one of: the at least one electronic flight bag (EFB); and the at least one cabin terminal includes a respective at least one proxy EFB AOC, wherein the master CMU AOC is communicatively coupled to the at least one proxy EFB AOC to distribute the AOC application based on the operational configuration of the Aircraft Operations Communication for the at least one proxy EFB AOC, wherein the at least one proxy EFB AOC provides access to the EFB data on the at least one proxy EFB to the one of the CMU or the CMF, wherein the at least one proxy AOC sends datalink messages to the at least one EFB human machine interface (HMI); and wherein the AOC application is distributed to the master CMU AOC based on the operational configuration of the Aircraft Operations Communication for the master CMU AOC.

Example 10 includes the system of any of Examples 8-9, wherein the database device is also communicatively coupled to the at least one of: the at least one electronic flight bag (EFB); and the at least one cabin terminal in the vehicle, wherein the AOC database distributes the AOC application to the at least one of: the at least one electronic flight bag (EFB); and the at least one cabin terminal based on the operational configuration of the respective at least one of: the at least one electronic flight bag (EFB); and the at least one cabin terminal.

Example 11 includes the system of any of Examples 1-10, wherein the at least one of: the at least one electronic flight bag (EFB); and the at least one cabin terminal in the vehicle includes: at least one cockpit EFB in a cockpit of the vehicle; and at least one cabin EFB in a cabin of the vehicle.

Example 12 includes the system of any of Examples 1-11, wherein the at least one of: the at least one electronic flight bag (EFB); and the at least one cabin terminal in the vehicle includes at least one of: at least one cockpit EFB in a cockpit of the vehicle; and at least one cabin terminal in a cabin of the vehicle.

Example 13 includes a method to distribute an Aircraft Operations Communication (AOC) application in a vehicle, the method comprising: loading at least one AOC database into at least one of: a database device in the vehicle; and at least one communication component in the vehicle, the communication components including: one of: a Communication Management Unit (CMU); or a Communication Management Function (CMF); and at least one of: at least one electronic flight bag (EFB); and at least one cabin terminal; configuring the operation of the communication components in the vehicle based on the at least one AOC database.

Example 14 includes the method of Example 13, wherein the at least one of: the at least one electronic flight bag (EFB); and the at least one cabin terminal includes a respective at least one proxy AOC, and wherein loading the at least one AOC database into at least one of: the database device in the vehicle; and the at least one communication component in the vehicle, comprises: loading the at least one AOC database into a master communication management unit (CMU) AOC in one of the CMU or the CMF, the method further comprising: distributing the AOC application to the master CMU AOC based on the operational configuration of the Aircraft Operations Communication for the master AOC; communicatively coupling the master CMU AOC to the at least one proxy EFB AOC; distributing the AOC application from the master CMU AOC to the proxy EFB AOC based on the operational configuration of the Aircraft Operations Communication for the proxy EFB AOC.

Example 15 includes the method of any of Examples 13-14, wherein the one of: the CMU; or the CMF includes a first AOC database, wherein the at least one of: the at least one electronic flight bag (EFB); and the at least one cabin terminal includes a respective at least one other AOC database, and wherein loading the at least one AOC database into at least one of: the database device in the vehicle; and the at least one communication component in the vehicle, comprises: loading the first AOC database into a communication management unit (CMU) AOC into the one of the CMU or CMF; distributing the AOC application to the CMU AOC based on the operational configuration of the Aircraft Operations Communication for the one of the CMU or CMF; loading the at least one other AOC database into a respective at least one EFB AOC in the respective at least one of: the at least one electronic flight bag (EFB); and the at least one cabin terminal; distributing the AOC application to the at least one EFB AOC based on the operational configuration of the Aircraft Operations Communication for the respective at least one of: the at least one electronic flight bag (EFB); and the at least one cabin terminal.

Example 16 includes the method of Example 15, further comprising: communicatively coupling the CMU AOC to the at least one EFB AOC for data sharing and sending datalink messages.

Example 17 includes the method of any of Examples 14-16, wherein loading the at least one AOC database into at least one of: the database device in the vehicle; and the at least one communication component in the vehicle, comprises: loading the AOC database into the database device; distributing the AOC application to the CMU AOC based on the operational configuration of the Aircraft Operations Communication for the one of the CMU or CMF; distributing the AOC application to the at least one EFB AOC based on the operational configuration of the Aircraft Operations Communication for the respective at least one of: the at least one electronic flight bag (EFB); and the at least one cabin terminal; and communicatively coupling the CMU AOC to the at least one EFB AOC for data sharing and sending datalink messages.

Example 18 includes the method of Example 17, wherein the CMU AOC is a master CMU AOC, and the at least one EFB AOC is at least one proxy EFB AOC, wherein distributing the AOC application to the at least one EFB AOC based on the operational configuration of the Aircraft Operations Communication for the respective at least one of: the at least one electronic flight bag (EFB); and the at least one cabin terminal comprises: distributing the AOC application to the at least one proxy EFB AOC via the master CMU AOC.

Example 19 includes the method of any of Examples 14-18, wherein configuring the operation of the communication components in the vehicle based on the AOC database comprises: configuring the operation of the communication components in the vehicle to: define message formats for the communication components in the vehicle; display uplinks in the communication components in the vehicle; display interfaces for human-machine interfaces for downlinks in the communication components in the vehicle; display data and message content; downlink messages from the communication components in the vehicle; and uplink messages to the communication components in the vehicle.

Example 20 includes a system to distribute an Aircraft Operations Communication (AOC) application, the system comprising: communication components in the vehicle including: one of: a Communication Management Unit (CMU) in the vehicle; or a Communication Management Function (CMF) in the vehicle; and a cockpit electronic flight bag (EFB) in a cockpit of a vehicle; and an AOC database, which includes an operational configuration for Aircraft Operations Communication for the communication components in the vehicle, the AOC database loaded into at least one of: the CMU, the CMF, the cockpit EFB, and a database device, wherein the AOC database configures the operation of the communication components in the vehicle.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system to distribute an Aircraft Operations Communication (AOC) application, the system comprising:
   communication components in a vehicle, the communication components including
   one of a Communication Management Unit (CMU) and a Communication Management Function (CMF); and
   at least one of at least one electronic flight bag (EFB) and at least one cabin terminal; and
   an AOC database, which includes an operational configuration for aircraft operations communication for the communication components in the vehicle, the AOC database distributed to at least one of the CMU, the CMF, the at least one EFB, the at least one cabin terminal, and a database device;
   wherein the distributed AOC database is used to at least one of share and allocate the AOC application to the communication components in the vehicle and configure the operation of associated communication components in the vehicle;
   wherein the one of the CMU or the CMF includes a master AOC in which the AOC database is loaded;
   wherein the at least one of: the at least one electronic flight bag (EFB); and the at least one cabin terminal includes a respective at least one proxy AOC;
   wherein the master AOC is communicatively coupled to the at least one proxy AOC to distribute the AOC application based on the operational configuration of the Aircraft Operations Communication for the proxy AOC;

wherein the AOC application is distributed to the master AOC based on the operational configuration of the Aircraft Operations Communication for the master AOC;

wherein the at least one proxy AOC provides access to the EFB data on the respective at least one of: the at least one electronic flight bag (EFB); and the at least one cabin terminal to the one of the CMU or the CMF; and wherein the at least one proxy AOC sends datalink messages to a human machine interface (HMI) of the respective at least one of: the at least one electronic flight bag (EFB); and the at least one cabin terminal.

2. The system of claim 1, wherein the AOC database configures the operation of the communication components in the vehicle for at least one of: defining message formats for the communication components in the vehicle; displaying of uplinks in the communication components in the vehicle; displaying of uplinks in a cockpit display in the vehicle; displaying on an EFB display; interacting with the EFB HMI; displaying on a cabin terminal display; interacting with the cabin terminal HMI; displaying of downlinks in the communication components in the vehicle; displaying of data content; downlinking of messages from the communication components in the vehicle; and uplinking of messages to the communication components in the vehicle.

3. The system of claim 1, wherein the at least one proxy AOC in the at least one of: the at least one electronic flight bag (EFB); and the at least one cabin terminal is communicatively coupled to: a human machine interface (HMI) of the respective at least one of: the at least one electronic flight bag (EFB); and the at least one cabin terminal, the HMI including a display; and an access in the at least one of: the at least one electronic flight bag (EFB); and the at least one cabin terminal to an external communication system.

4. The system of claim 1, wherein the one of the CMU or the CMF includes a communication management unit (CMU) AOC, a router, an access to at least one external communication system; and an interface to a human machine interface/display in the cockpit.

5. The system of claim 1, wherein the one of the CMU or the CMF includes a master AOC in which the AOC database is loaded, a router, and an access to at least one external communication system; and wherein the at least one of: the at least one electronic flight bag (EFB); and the at least one cabin terminal in the vehicle includes a respective at least one: proxy AOC, a human machine interface, a display, and an access to one of the at least one external communication systems.

6. The system of claim 1, wherein the one of the CMU or the CMF includes a communication management unit (CMU) AOC in which a first AOC database is loaded, and wherein the at least one of: the at least one electronic flight bag (EFB); and the at least one cabin terminal includes a respective at least one EFB AOC in which a respective at least one second AOC database is loaded, wherein the CMU AOC is communicatively coupled to the at least one EFB AOC and to a human machine interface/display in the cockpit, wherein the CMU AOC distributes the AOC application based on the operational configuration of the one of the CMU or the CMF, wherein the at least one EFB AOC distributes the AOC application based on the operational configuration of the respective at least one of: the at least one electronic flight bag (EFB); and the at least one cabin terminal.

7. The system of claim 1, wherein the AOC database is loaded in the database device, wherein the database device is communicatively coupled to the one of the CMU or the CMF, wherein the AOC database distributes the AOC application to the one of the CMU or the CMF based on the operational configuration of the respective one of the CMU or the CMF.

8. The system of claim 7, wherein the one of the CMU or the CMF includes a master communication management unit (CMU) AOC, wherein the at least one of: the at least one EFB; and the at least one cabin terminal includes a respective at least one proxy EFB AOC, wherein the master CMU AOC is communicatively coupled to the at least one proxy EFB AOC to distribute the AOC application based on the operational configuration of the Aircraft Operations Communication for the at least one proxy EFB AOC, wherein the at least one proxy EFB AOC provides access to the EFB data on the at least one proxy EFB to the one of the CMU or the CMF, wherein the at least one proxy AOC sends datalink messages to the at least one EFB human machine interface (HMI); and wherein the AOC application is distributed to the master CMU AOC based on the operational configuration of the Aircraft Operations Communication for the master CMU AOC.

9. The system of claim 7, wherein the database device is also communicatively coupled to the at least one of: the at least one electronic flight bag (EFB); and the at least one cabin terminal in the vehicle, wherein the AOC database distributes the AOC application to the at least one of: the at least one electronic flight bag (EFB); and the at least one cabin terminal based on the operational configuration of the respective at least one of: the at least one electronic flight bag (EFB); and the at least one cabin terminal.

10. The system of claim 1, wherein the at least one of: the at least one electronic flight bag (EFB); and the at least one cabin terminal in the vehicle includes:
at least one cockpit EFB in a cockpit of the vehicle; and
at least one cabin EFB in a cabin of the vehicle.

11. The system of claim 1, wherein the at least one of: the at least one electronic flight bag (EFB); and the at least one cabin terminal in the vehicle includes at least one of:
at least one cockpit EFB in a cockpit of the vehicle; and
at least one cabin terminal in a cabin of the vehicle.

12. A method to distribute an Aircraft Operations Communication (AOC) application in a vehicle, the method comprising:
distributing at least one AOC database into at least one of
a database device in the vehicle; and
communication components in the vehicle, the communication components including:
one of a Communication Management Unit (CMU) and a Communication Management Function (CMF); and
at least one of at least one electronic flight bag (EFB) and at least one cabin terminal;
using the distributed at least one AOC database to at least one of share and allocate the AOC application to the communication components in the vehicle;
wherein the at least one of: the at least one electronic flight bag (EFB); and the at least one cabin terminal includes a respective at least one proxy AOC, and wherein loading the at least one AOC database into at least one of: the database device in the vehicle; and the at least one communication component in the vehicle, comprises:

loading the at least one AOC database into a master communication management unit (CMU) AOC in one of the CMU or the CMF, the method further comprising:
  distributing the AOC application to the master CMU AOC based on the operational configuration of the Aircraft Operations Communication for the master AOC;
  communicatively coupling the master CMU AOC to the at least one proxy EFB AOC; and
  distributing the AOC application from the master CMU AOC to the proxy EFB AOC based on the operational configuration of the Aircraft Operations Communication for the proxy EFB AOC.

13. The method of claim 12, wherein loading the at least one AOC database into at least one of: the database device in the vehicle; and the at least one communication component in the vehicle, comprises:
  loading the AOC database into the database device;
  distributing the AOC application to the CMU AOC based on the operational configuration of the Aircraft Operations Communication for the one of the CMU or CMF;
  distributing the AOC application to the at least one EFB AOC based on the operational configuration of the Aircraft Operations Communication for the respective at least one of: the at least one electronic flight bag (EFB); and the at least one cabin terminal; and
  communicatively coupling the CMU AOC to the at least one EFB AOC for data sharing and sending datalink messages.

14. The method of claim 13, wherein the CMU AOC is a master CMU AOC, and the at least one EFB AOC is at least one proxy EFB AOC, wherein distributing the AOC application to the at least one EFB AOC based on the operational configuration of the Aircraft Operations Communication for the respective at least one of: the at least one electronic flight bag (EFB); and the at least one cabin terminal comprises:
  distributing the AOC application to the at least one proxy EFB AOC via the master CMU AOC.

15. The method of claim 12, wherein configuring the operation of the communication components in the vehicle based on the AOC database comprises: configuring the operation of the communication components in the vehicle to:
  define message formats for the communication components in the vehicle;
  display uplinks in the communication components in the vehicle;
  display interfaces for human-machine interfaces for downlinks in the communication components in the vehicle;
  display data and message content;
  downlink messages from the communication components in the vehicle; and
  uplink messages to the communication components in the vehicle.

16. A method to distribute an Aircraft Operations Communication (AOC) application in a vehicle, the method comprising:
  distributing at least one AOC database into at least one of
    a database device in the vehicle; and
    communication components in the vehicle, the communication components including:
      one of a Communication Management Unit (CMU) and a Communication Management Function (CMF); and
      at least one of at least one electronic flight bag (EFB) and at least one cabin terminal; and
  using the distributed at least one AOC database to at least one of share and allocate the AOC application to the communication components in the vehicle;
  wherein the one of: the CMU; or the CMF includes a first AOC database, wherein the at least one of: the at least one electronic flight bag (EFB); and the at least one cabin terminal includes a respective at least one other AOC database, and wherein loading the at least one AOC database into at least one of: the database device in the vehicle; and the at least one communication component in the vehicle, comprises:
  loading the first AOC database into a communication management unit (CMU) AOC into the one of the CMU or CMF;
  distributing the AOC application to the CMU AOC based on the operational configuration of the Aircraft Operations Communication for the one of the CMU or CMF;
  loading the at least one other AOC database into a respective at least one EFB AOC in the respective at least one of: the at least one electronic flight bag (EFB); and the at least one cabin terminal;
  distributing the AOC application to the at least one EFB AOC based on the operational configuration of the Aircraft Operations Communication for the respective at least one of: the at least one electronic flight bag (EFB); and the at least one cabin terminal.

17. The method of claim 16, further comprising:
  communicatively coupling the CMU AOC to the at least one EFB AOC for data sharing and sending datalink messages.

* * * * *